United States Patent
Lee et al.

(10) Patent No.: US 7,212,157 B2
(45) Date of Patent: May 1, 2007

(54) METHOD FOR CREATING ACQUISITION ASSISTANCE INFORMATION IN ASSISTED GLOBAL POSITIONING SYSTEM

(75) Inventors: Young-Sik Lee, Seoul (KR); Jae-Young Jung, Seoul (KR); Dong-Jun Kum, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 141 days.

(21) Appl. No.: 10/932,419

(22) Filed: Sep. 2, 2004

(65) Prior Publication Data
US 2005/0093742 A1    May 5, 2005

(30) Foreign Application Priority Data
Oct. 31, 2003    (KR)    ........................ 10-2003-0077067

(51) Int. Cl.
*G01S 5/14*    (2006.01)
(52) U.S. Cl. .............................. 342/357.15; 342/357.09
(58) Field of Classification Search ........... 342/357.15, 342/357.09
See application file for complete search history.

(56) References Cited

U.S. PATENT DOCUMENTS

| | | | | |
|---|---|---|---|---|
| 6,067,045 | A * | 5/2000 | Castelloe et al. | 342/357.09 |
| 6,903,683 | B1 * | 6/2005 | Nicholson | 342/357.09 |
| 6,993,345 | B2 * | 1/2006 | Ogino et al. | 342/357.15 |
| 2002/0032527 | A1 * | 3/2002 | Diggelen | 342/357.09 |

OTHER PUBLICATIONS

K. Ebina et al., Investigation of single-hop connections between user terminals in geostationary mobile satellite communication systems, IEEE Global Telecommunications Conference, vol. 4, p. 2764-2768, Nov. 2001.*

* cited by examiner

*Primary Examiner*—Thomas H. Tarcza
*Assistant Examiner*—Fred H. Mull
(74) *Attorney, Agent, or Firm*—The Farrell Law Firm

(57) ABSTRACT

A method for creating acquisition assistance information (AA data) for acquiring of a global positioning system (GPS) signal in an assisted global positioning system (AGPS) is provided. The method includes receiving repeater information included in a mobile communication network of a terminal whose location is to be measured, in response to a request for the acquisition assistance information for the GPS signal from the terminal, determining a repeater delay caused by a repeater that is present between the terminal and a base station that is synchronized with the terminal using the repeater information, and creating the acquisition assistance information for the GPS signal of the terminal based on the repeater delay. The AA data that is based on the repeater delay enables a terminal to more finely and stably acquire the GPS satellite signal. Also, accurate and stable acquisition of the GPS satellite signal of the terminal enhances the accuracy of calculation of the terminal location in the AGPS.

8 Claims, 9 Drawing Sheets

METHOD FOR CREATING ACQUISITION ASSISTANCE INFORMATION IN ASSISTED GLOBAL POSITIONING SYSTEM

This application claims priority under 35 U.S.C. § 119 to an application entitled "Method for Creating Acquisition Assistance Information in Assisted Global Positioning System" filed in the Korean Intellectual Property Office on Oct. 31, 2003 and assigned Serial No. 2003-77067, the contents of which are incorporated herein by reference.

BACKGROUND OF THE INVENTION

1. Field of the Invention

The present invention relates generally to an assisted global positioning system (AGPS), and in particular, to a method for creating GPS acquisition assistance information (hereafter referred to as "AA data") required in terminal location determination in the AGPS.

2. Description of the Related Art

Location determination techniques using GPS satellites have come into wide use in various fields, particularly in location measurement of car and ship navigation systems and mobile communication terminals. To measure locations using the GPS satellites, a GPS receiver is mounted in a target device whose location is to be measured, such as in the car and ship navigation systems and mobile communication terminals, and the GPS receiver continuously receives GPS signals from the GPS satellites. However, such an operation consumes much power. In particular, since mobile terminals use batteries having a limited amount of power, the amount of time during which conversations can take place is reduced due to power consumption of the GPS receiver.

To solve such a problem, it has been suggested that a terminal should enable its GPS receiver only when location measurement is necessary. Although this method reduces power consumption of the battery of the terminal, it takes a long time for the GPS receiver to acquire GPS satellite signals required for location measurement.

Thus, to solve problems concerning power consumption of a GPS receiver and the amount of time taken by GPS satellite signal acquisition in a terminal, an AGPS has been used. The AGPS provides AA data for GPS signal acquisition to a terminal, thereby allowing the GPS receiver to more quickly acquire GPS signals using the provided AA data.

Hereinafter, a procedure for determining a location of a terminal in a general AGPS will be described with reference to FIG. 1, which is a block diagram of a general AGPS, and to FIG. 2, which is a flow diagram illustrating a terminal location determination procedure in the general AGPS.

Referring to FIG. 1, the AGPS includes a mobile communication terminal 10, a GPS satellite 20, a mobile communication network 30, a location determination server 40, and a reference station GPS receiver 50.

The mobile communication terminal (hereinafter, referred to as a "terminal") 10 has a built-in GPS receiver, receives a GPS signal from the GPS satellite 20, and is connected to the location determination server 40 through the mobile communication network 30. In the case of a synchronous code division multiple access (CDMA) system, the mobile communication network 30 may comprise base stations 32, a base station controller 34, and a mobile switching center 36. By performing radio communication with the base stations 32, the terminal 10 is connected to the location determination server 40 via the base station controller 34 and the mobile switching center 36. In the case of an asynchronous wideband code division multiple access (WCDMA) system, the mobile communication network 30 may comprise a Node-B and a radio network controller (RNC), and the terminal 10 may perform radio communication with the Node-B and be connected to the location determination server 40 via the RNC. FIG. 1 shows the synchronous CDMA system.

The location determination server 40 has mounted thereon the reference station GPS receiver 50 and receives GPS satellite information through the reference station GPS receiver 50.

Referring to FIG. 2, the terminal 10 sends a terminal location determination request to the location determination server 40 in step 102. In some cases, the terminal location determination request can be generated in the location determination server 40. After sending the terminal location determination request, the terminal 10 sends an AA data request for GPS satellite signal acquisition to the location determination server 40 via the mobile communication network 30 in step 104. The GPS satellite signal is acquired by modulating navigation data at 50 Hz with an inherent pseudo noise code (also called a Gold code) for each satellite using spread spectrum, loading the spread navigation data on a carrier wave signal of about 1.5 GHz, and then modulating the resultant signal using binary phase shift keying (BPSK). Thus, in order for the terminal 10 to acquire the GPS satellite signal, the inherent pseudo noise code for each satellite and the carrier wave signal of 1.5 GHz must be removed from the GPS signal received by the GPS receiver. Information needed by the terminal for such removal 10 is called AA data. The AA data includes a GPS PRN (Pseudo-Random Number) that is observable by the terminal 10, a time of application (TOA), pseudo distance information and pseudo distance search range information of the GPS satellite 20, and Doppler frequency information and Doppler search range information of the GPS satellite 20.

The location determination server 40 creates the AA data using GPS satellite information in step 106 in response to the AA data request from the terminal 10. In other words, the location determination server 40 estimates an initial presumed location of the terminal 10 using base station information and determines the TOA. Then the location determination server 40 calculates pseudo distance information SV_CODE_PH of the GPS satellite 20 which can be received by the terminal 10 in the initial presumed location at the TOA, sets a pseudo distance search range SV_CODE_PH_WIN, calculates Doppler information DOPPLERO of the GPS satellite 20, and sets a Doppler search range DOPPLER_WIN. Also, the location determination server 40 creates the AA data using the calculated SV_CODE_PH, SV_CODE_PH_WIN, DOPPLERO, and DOPPLER_WIN.

The location determination server 40 provides the created AA data to the terminal 10 in step 108. In step 110, the terminal 10 acquires the GPS satellite signal using the AA data and measures the pseudo distance information of the GPS satellite 20. The method by which the terminal 10 acquires the GPS satellite signal using the AA data will be described with reference to FIG. 3.

After measuring the pseudo distance information of the GPS satellite 20, the terminal 10 provides the measured pseudo distance information of the GPS satellite 20 to the location determination server 40 in step 112. In step 114, the location determination server 40 calculates a location of the terminal 10 using the pseudo distance information of the GPS satellite 20 which is provided from the terminal 10. Then the location determination server 40 provides the calculated location information of the terminal 10 to the terminal 10 in step 116. Calculation of the location of the terminal 10, in step 114, may be undertaken by the location determination server 40, or if the location determination server 40 provides satellite orbit information ("Ephemeris"), the calculation can be performed by the terminal 10.

However, in the above location determination procedure on the terminal 10, if there is a repeater in the base stations 32, a repeater delay occurs. As a result, the actual SV_CODE_PH and DOPPLERO of the terminal 10 fall outside SV_CODE_PH_WIN and DOPPLER_WIN of the AA data. If the actual SV_CODE_PH and DOPPLERO of the terminal 10 fall outside SV_CODE_PH_WIN and DOPPLER_WIN of the AA data, the terminal 10 cannot acquire the GPS satellite signal.

FIG. 3 shows the pseudo distance information SV_CODE_PH, the pseudo distance search range SV_CODE_PH_WIN, the Doppler information DOPPLERO, and the Doppler search range DOPPLER_WIN, all of which are included in the AA data according to prior art. A procedure in which the terminal 10 acquires the GPS satellite signal using the AA data provided from the location determination server 40 will be described with reference to FIG. 3.

Referring to FIG. 3, the terminal 10 searches SV_CODE_PH_WIN around SV_CODE_PH within an entire code search range for pseudo distance information and searches DOPPLER_WIN around DOPPLERO within an entire Doppler search range for Doppler information, based on the AA data provided from the location determination server 40. In other words, since the terminal 10 searches a code and Doppler search range 160 corresponding to the AA data without searching an entire code and Doppler search range, searching can be performed quickly. If actual code and Doppler information of the terminal 10 falls within a predetermined range 150 of the code and Doppler search range 160 corresponding to the AA data, the terminal 10 can acquire the GPS satellite signal.

However, if the actual code and Doppler information of the terminal 10 falls within a range 155 that is outside the code and Doppler search range 160 corresponding to the AA data due to a repeater delay, the terminal 10 cannot acquire the GPS satellite signal. If the terminal 10 cannot acquire the GPS satellite signal, it is impossible to calculate the location of the terminal 10.

FIGS. 4A and 4B show pseudo distance information and a pseudo distance search range according to the prior art, where the actual code and Doppler information of the terminal 10 falls outside the code and Doppler search range 160 corresponding to the AA data.

In FIGS. 4A and 4B, SV_CODE_PH represents pseudo distance information calculated by the location determination server 40, SV_CODE_PH_WIN represents a pseudo distance search range that is set around the calculated SV_CODE_PH, and DELAY represents a location of a pseudo distance of the GPS satellite 20, which has been measured by the terminal 10 and is delayed by a repeater delay introduced by a repeater that exists in the base station 32. As shown in FIG. 4A, if the pseudo distance of the GPS satellite 20 measured by the terminal 10 falls outside the set SV_CODE_PH_WIN, the terminal 10 fails to acquire the GPS satellite signal and cannot acquire the location thereof.

Conventionally, to solve such a problem, the terminal 10 shifts the TOA of the AA data for GPS signal acquisition, or sets SV_CODE_PH_WIN and DOPPLER_WIN to cover a larger range.

FIG. 4B shows an example where the terminal 10 shifts the TOA of the AA data for GPS signal acquisition. In FIG. 4B, SV_CODE_PH shifted to the right side and SV_CODE_PH_WIN set around the shifted SV_CODE_PH are shown. In this way, if SV_CODE_PH is shifted and SV_CODE_PH_WIN is set around the shifted SV_CODE_PH, a time to first fix (hereinafter, referred to as a "TTFF") that is required until the terminal 10 acquires the GPS satellite signal is increased by the amount of shift of SV_CODE_PH. Also, conventionally, the TOA is shifted without consideration of a bias error of a terminal clock, which is caused by a repeater delay of a serving base station. As a result, the terminal 10 often cannot acquire the GPS satellite signal even when the TOA is shifted.

Also, when SV_CODE_PH_WIN and DOPPLER_WIN are set to cover a larger range, the TTFF is increased and often the terminal 10 still cannot acquire the GPS satellite signal.

In conclusion, according to the prior art, if a bias error is included in an error of a terminal clock in an AGPS due to the occurrence of a repeater delay, there occurs large differences among the GPS satellite signal received by the terminal 10 and SV_CODE_PH and DOPPLERO of the AA data at the TOA. Thus, when the terminal 10 applies the AA data for GPS satellite signal acquisition, the GPS satellite signal received by the terminal 10 falls outside SV_CODE_PH_WIN and DOPPLER_WIN, resulting in failure to acquire a GPS satellite signal. As a result, the location of the terminal 10 cannot be measured.

SUMMARY OF THE INVENTION

It is, therefore, an object of the present invention to provide a method for creating repeater delay-based AA data in an AGPS.

It is another object of the present invention to provide a method for enabling a terminal to accurately acquire a GPS satellite signal using repeater delay-based AA data in an AGPS.

It is still another object of the present invention to provide a method for solving a problem whereby a terminal location cannot be measured due to GPS satellite signal acquisition failure in an AGPS.

To achieve the above and other objects, there is provided a method for creating acquisition assistance information for acquisition of a global positioning system (GPS) signal in an assisted global positioning system (AGPS). The method includes the steps of receiving repeater information included in a mobile communication network of a terminal whose location is to be measured, in response to a request for the acquisition assistance information for acquisition of the GPS signal from the terminal, determining a repeater delay introduced by a repeater that is present between the terminal and a base station that is synchronized with the terminal using the repeater information, and creating the acquisition assistance information for acquisition of the GPS signal of the terminal based on the repeater delay. The repeater information may be received from an external repeater information database.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
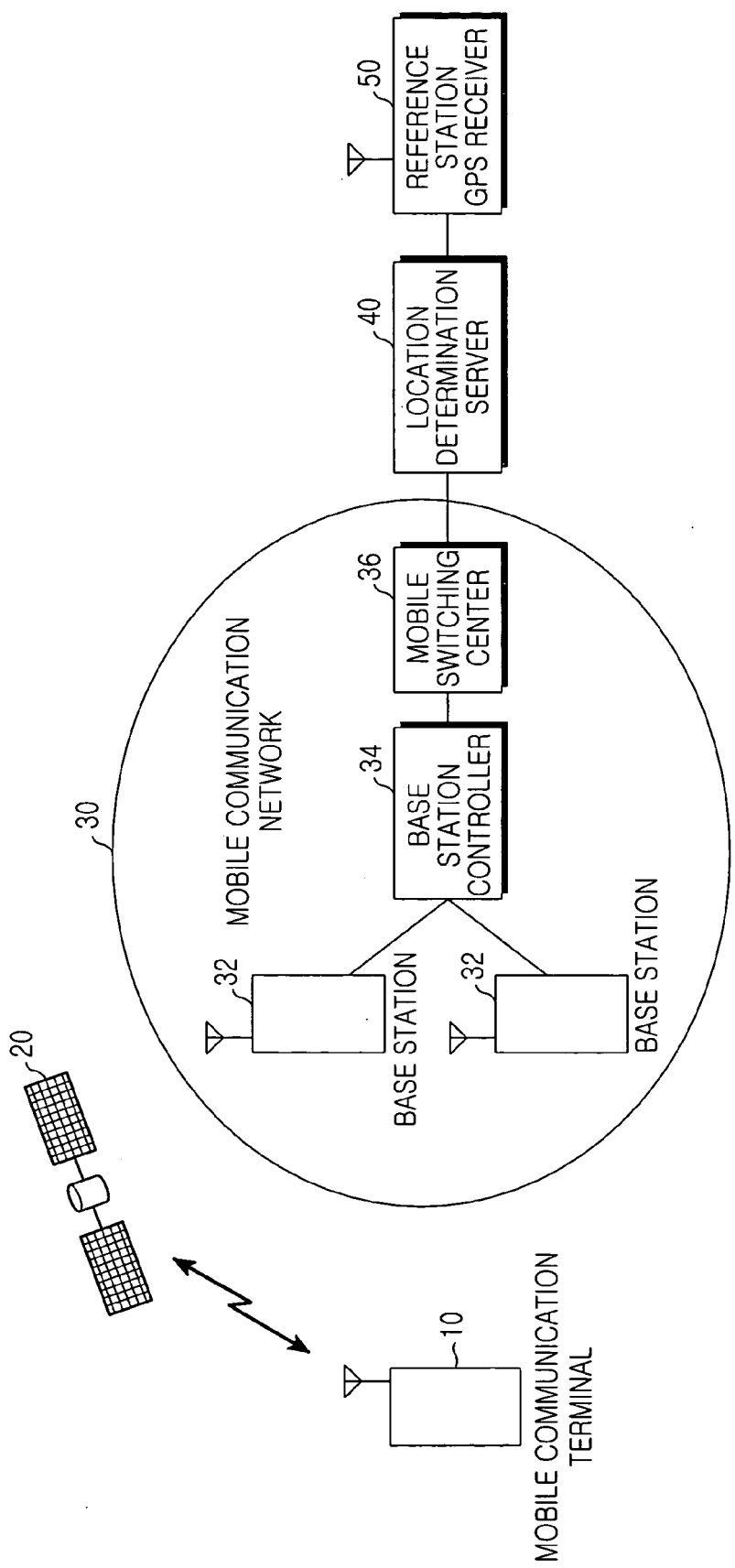
FIG. 1 is a block diagram of a general AGPS.
Figure 2:
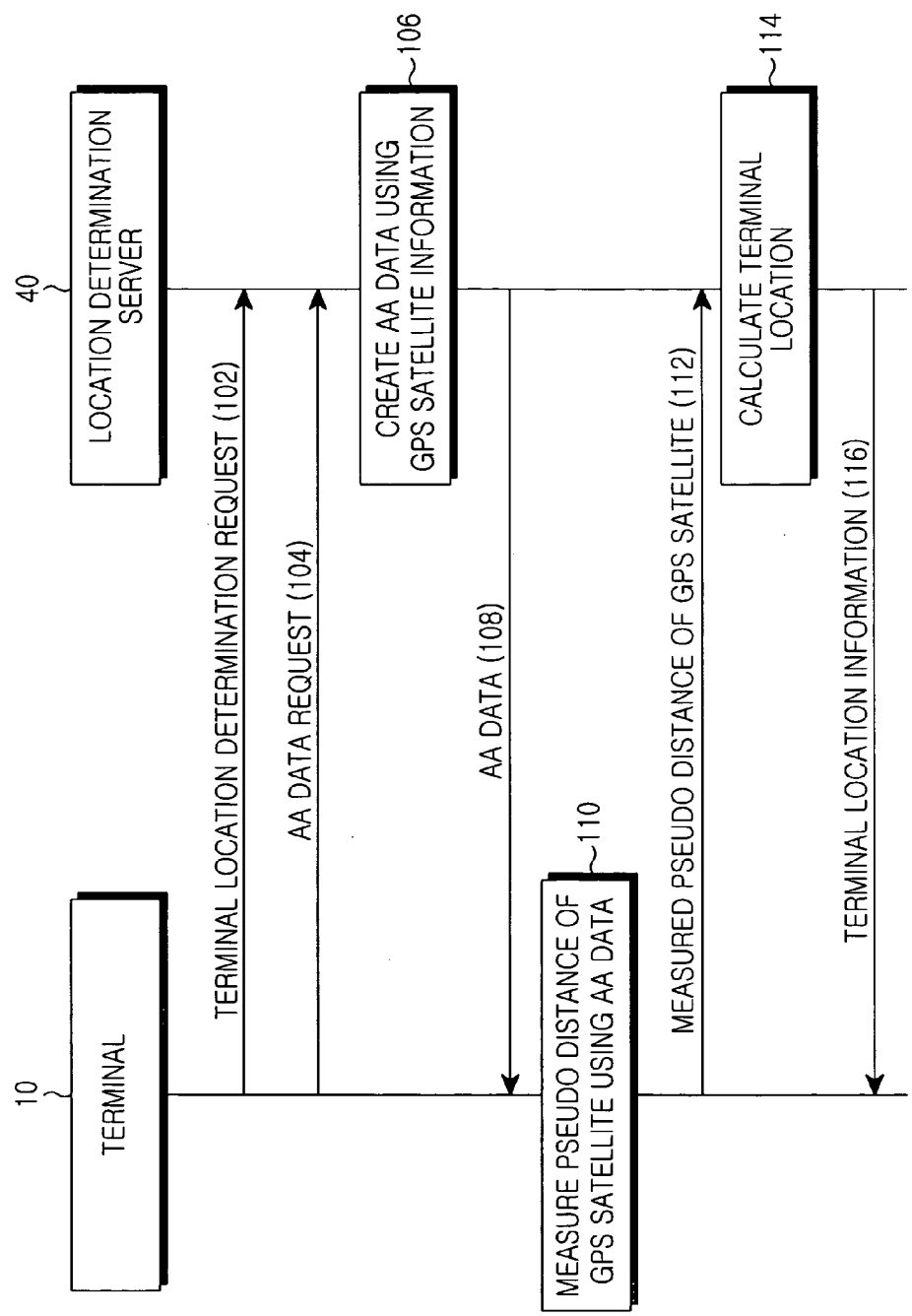
FIG. 2 is a flow diagram illustrating a terminal location determination procedure using AA data according to the prior art.
Figure 3:
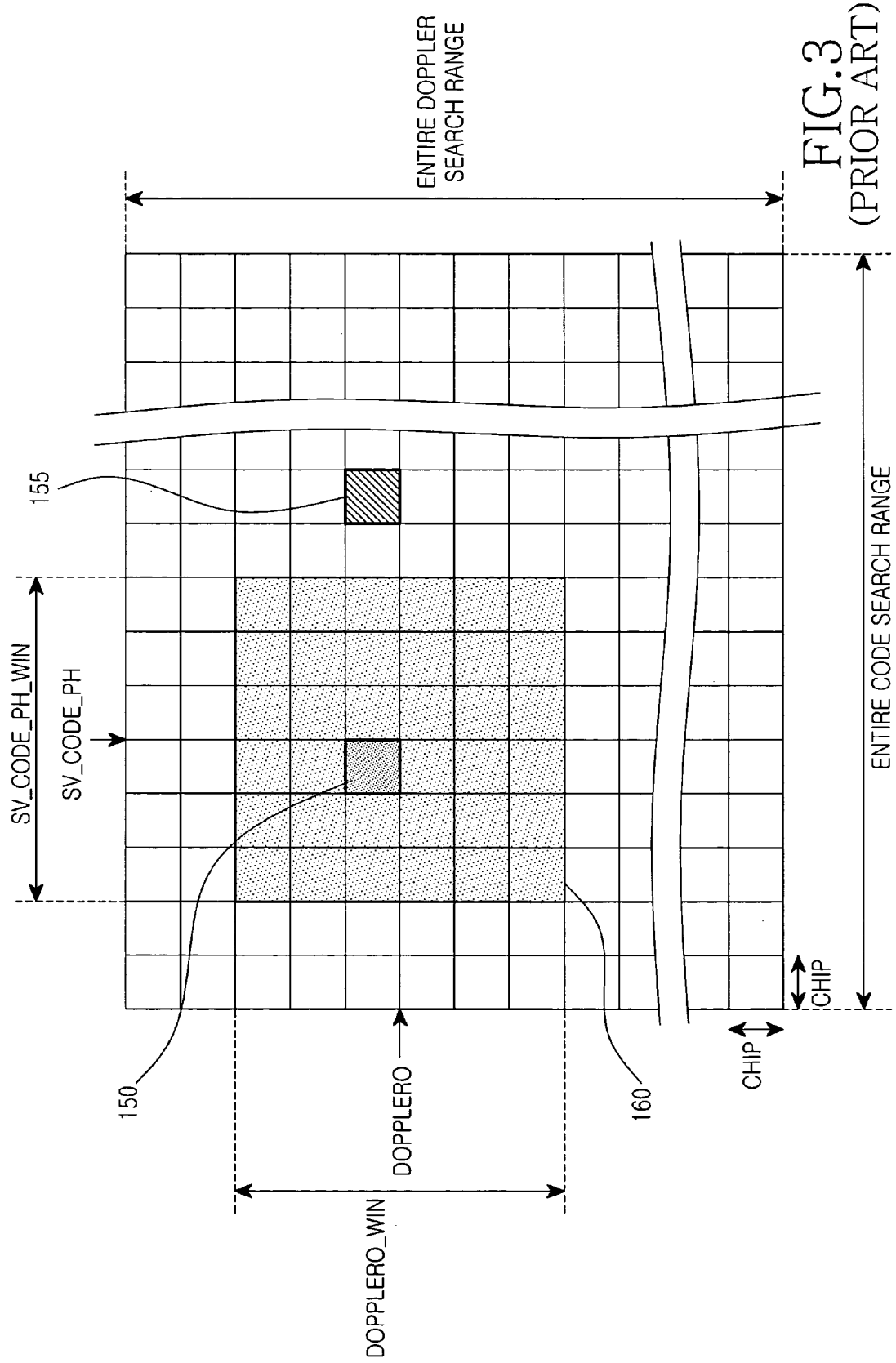
FIG. 3 shows a diagram including pseudo distance information, a pseudo distance search range, Doppler information, and a Doppler search range, all of which are included in AA data according to the prior art.
Figure 4A:
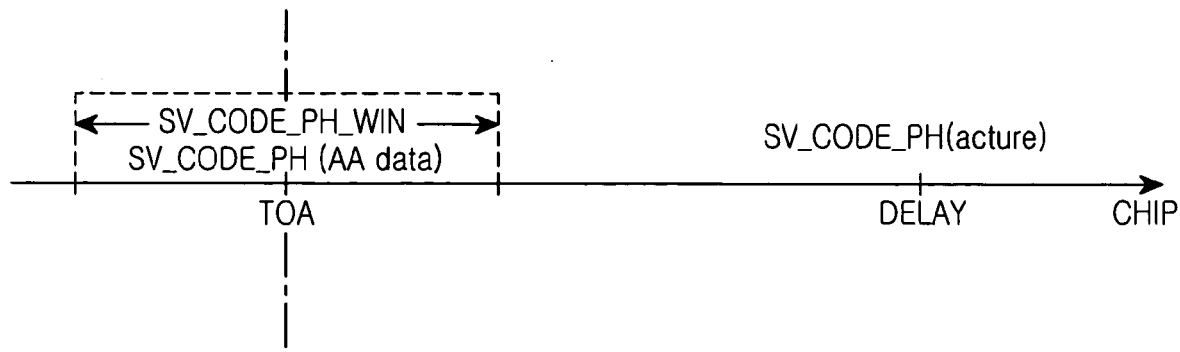
FIGS. 4A and 4B show graphs of pseudo distance information and a pseudo distance search range according to the prior art.
Figure 4B:
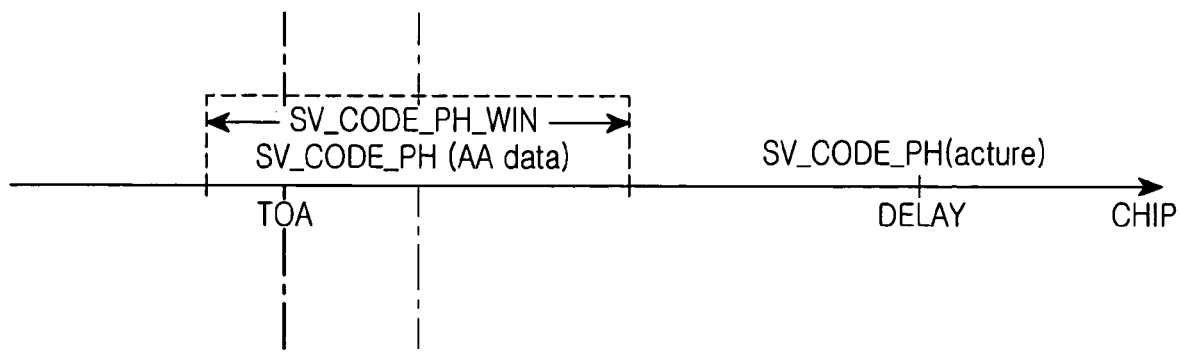

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 5A:
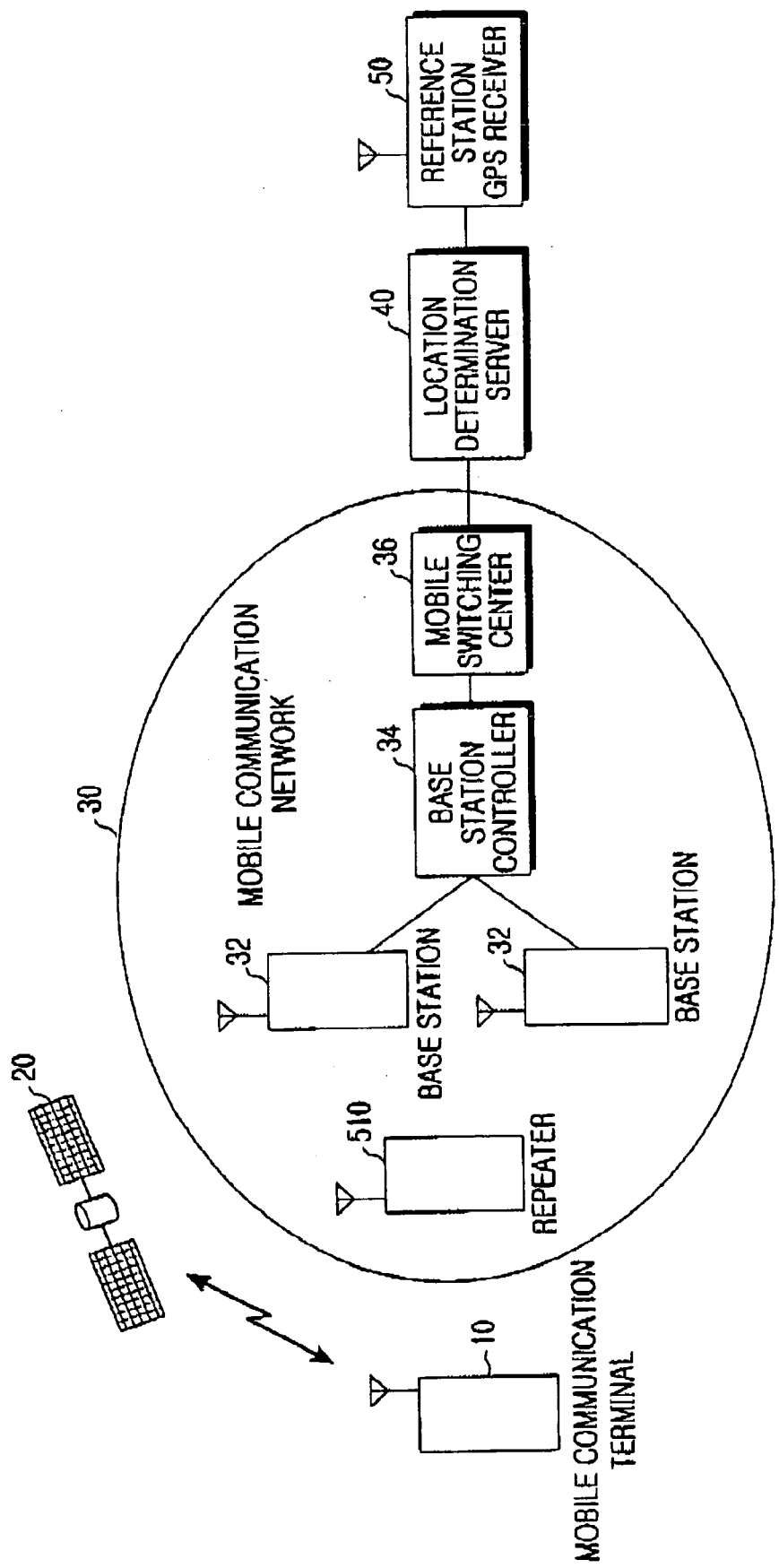
FIG. 5A is a block diagram of an Assisted Global Positioning System (AGPS) according to the present invention.
Figure 5B:
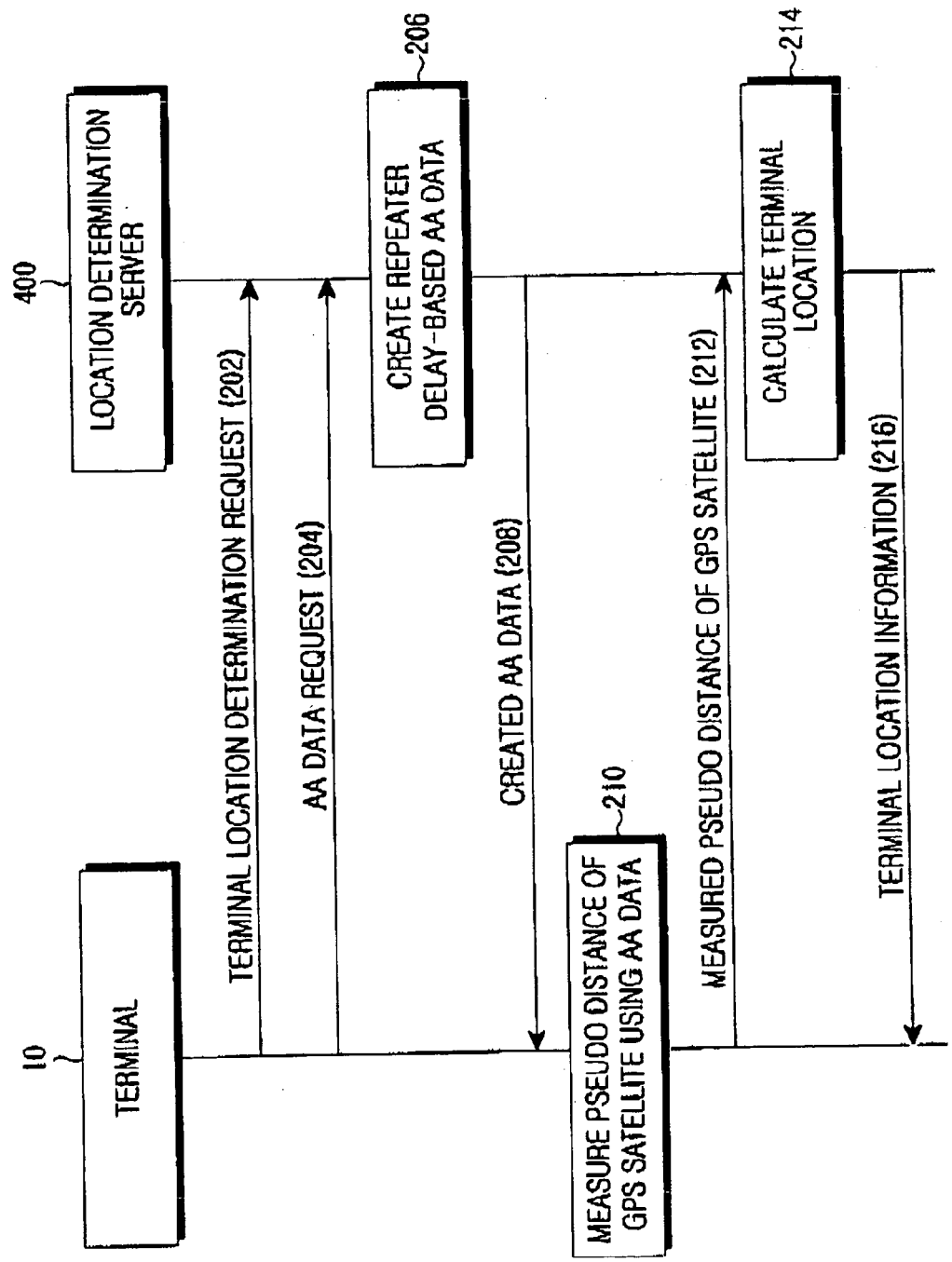
FIG. 5B is a flow diagram illustrating a terminal location determination procedure using AA data according to the present invention.
Figure 6:
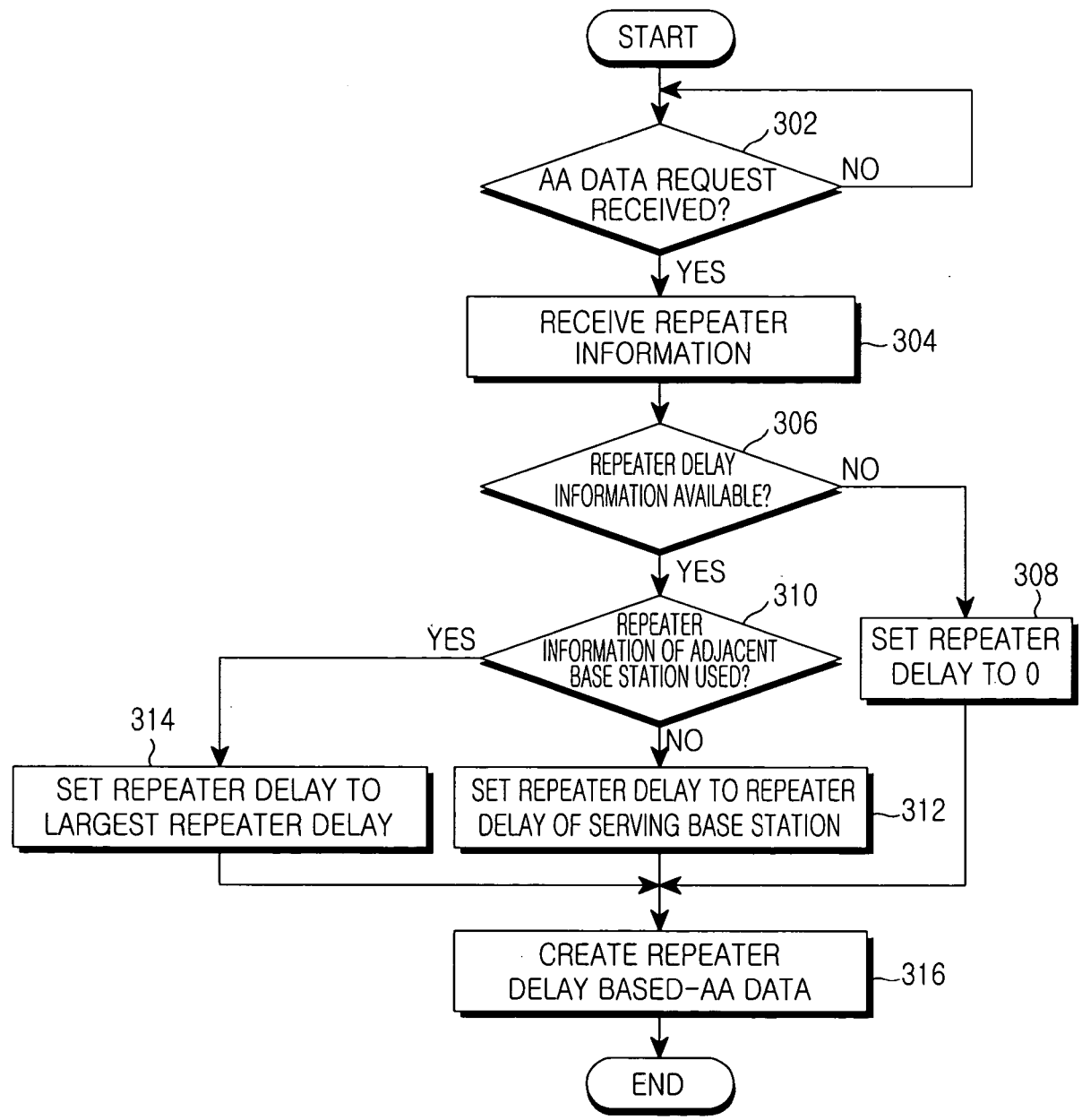
FIG. 6 is a flowchart illustrating a procedure for creating AA data according to an embodiment of the present invention.

FIG. 5B is a flow diagram illustrating a terminal location determination procedure using AA data according to an embodiment of the present invention, and FIG. 6 is a flowchart illustrating a procedure for creating AA data according to an embodiment of the present invention. A method for creating repeater delay-based AA data and a terminal location determination procedure using the method according to an embodiment of the present invention will be described with reference to FIGS. 5B and 6. FIG. 5A shows a repeater (510) to which the invention applies.

Referring to FIG. 5B, a terminal 100 sends a terminal location determination request to a location determination server 400 in step 202. In some cases, the terminal location determination request may be generated in the location determination server 400. The terminal 100 sends an AA data request for GPS satellite signal acquisition to the location determination server 400 through a mobile communication network in step 204. A GPS satellite signal is acquired by modulating navigation data at 50 Hz with an inherent pseudo noise code (also called a Gold code) for each satellite using spread spectrum, loading the spread navigation data on a carrier wave signal of about 1.5 GHz, and then modulating the resultant signal using binary phase shift keying (BPSK). Therefore, in order for the terminal 100 to acquire the GPS satellite signal, the inherent pseudo noise code for each satellite and the carrier wave signal of 1.5 GHz must be removed from the GPS signal received by a GPS receiver. Information needed by the terminal 100 for such removal is called AA data. The AA data includes a GPS PRN that is observable by the terminal 100, a time of application (TOA), pseudo distance information and a pseudo distance search range of a GPS satellite, and Doppler frequency information and a Doppler search range of the GPS satellite.

In response to the AA data request from the terminal 100, the location determination server 400 creates repeater delay-based AA data using GPS satellite information and repeater delay information, in step 206. A method by which the location determination server 400 creates the repeater delay-based AA data will be described in detail with reference to FIG. 6.

The location determination server 400 creates the repeater delay-based AA data and then provides the created AA data to the terminal 100 in step 208. The terminal 100 acquires the GPS satellite signal using the repeater delay-based AA data and measures pseudo distance information of the GPS satellite using the acquired GPS satellite signal, in step 210. In addition, the terminal 100 provides the measured pseudo distance information of the GPS satellite to the location determination server 400 in step 212. In step 214, the location determination server 400 calculates a location of a current terminal 100 using the pseudo distance information of the GPS satellite, which is provided from the terminal 100. Then, the location determination server 400 provides the calculated location information to the terminal 100 in step 216.

In other words, according to an embodiment of the present invention, the terminal 100 can acquire the GPS satellite signal using the repeater delay-based AA data that is created in the location determination server 400 even when actual code and Doppler information are delayed by the repeater delay.

Referring to FIG. 6, the location determination server 400 determines in step 302 whether an AA data request is received from the terminal 100. If the AA data request is received from the terminal 100, the location determination server 400 proceeds to step 304 where it receives information on a repeater; such as location of the repeater, that is present in a mobile communication network connected to the location determination server 400. Also, repeater information including a repeater location estimated through analysis of a base station signal that can be measured by the terminal 100 can be received. The location determination server 400 receives the repeater information and then determines in step 306 whether repeater delay information is available. For example, the location determination server 400 determines that the repeater delay information is available if it successfully receives the repeater information from a repeater information database or through analysis of a base station signal. However, the location determination server 400 determines that the repeater delay information is not available if the repeater information is not normally read from the repeater information database or cannot be estimated through analysis of the base station signal.

If the repeater delay information is not available, the location determination server 400 proceeds to step 308 where it sets to 0 the repeater delay that is to be considered during creation of the AA data.

In contrast, if the repeater delay information is available, the location determination server 400 proceeds to step 310 where it determines whether to use information on a repeater of an adjacent base station. In other words, the location determination server 400 determines whether to use only repeater delay information of a serving base station, or also to use repeater delay information of an adjacent base station along with the serving base station. The repeater delay information of the serving base station represents a difference between 'an estimated arrival time difference between a serving base station signal and an adjacent base station signal that are received by a terminal at an initial presumed location of the terminal' and 'a measured arrival time difference between a serving base station signal and an adjacent base station signal that are actually received by the terminal'. The repeater delay information of the adjacent base station represents the sum of 'the repeater delay information of the serving base station' and the difference between 'an estimated arrival time difference between a serving base station signal and an adjacent base station signal that are received by a terminal at an initial presumed location of the terminal' and 'a measured arrival time difference between a serving base station signal and an adjacent base station signal that are actually received by the terminal'. If there is no repeater delay information of the serving base station, then the repeater delay of the adjacent base station is a difference between 'the measured arrival time difference between the serving base station signal and adjacent base station signal that are actually measured by the terminal' and 'the estimated arrival time difference between the serving base station signal and the adjacent base station signal'.

As a result of the determination, if the location determination server 400 determines to use only the repeater delay information of the serving base station, it proceeds to step 312 where it sets a repeater delay (hereinafter, referred to as 'DELAY') to the repeater delay of the serving base station.

However, as a result of the determination, if the location determination server 400 determines to use the repeater delay information of both the serving base station and the adjacent base station, it proceeds to step 314 where it sets the DELAY to the largest value among repeater delays of all the base stations including the serving base station and the adjacent base station.

After setting the DELAY as described above, the location determination server 400 creates AA data based on the DELAY in step 316. In other words, after the location determination server 400 determines the TOA of the AA data to be applied when the terminal 100 acquires the GPS satellite signal, it creates the AA data by calculating a pseudo distance of a GPS satellite and Doppler information of the GPS satellite based on the DELAY at the TOA and setting a pseudo distance search range that is a search range of the pseudo distance, and a Doppler search range that is a search range of the Doppler information.

Hereinafter, a detailed description will be made of a procedure in which the location determination server 400 calculates the pseudo distance of the GPS satellite and the Doppler information of the GPS satellite based on the DELAY and sets the pseudo distance search range and the Doppler search range.

First, a description will be made of a procedure in which the location determination server 400 calculates the pseudo distance of the GPS satellite based on the DELAY and sets the pseudo distance search range. The location determination server 400 estimates the initial presumed location of the terminal 100 using base station information. There are several methods of estimating an initial presumed location of a terminal, but the location determination server 400 preferably uses base station information. For example, the location determination server 400 estimates the initial presumed location of the terminal 100 using sector center information of a serving base station that is clock-synchronized with the terminal 100. The location determination server 400 determines the TOA based on a one-way delay to a base station that is clock-synchronized with the terminal 100. Once the location determination server 400 estimates the initial presumed location of the terminal 100 and determines the TOA, it calculates GPS satellite coordinates using GPS satellite information received by a reference station GPS receiver. Also, the location determination server 400 calculates a pseudo distance of a GPS satellite, which can be received by the terminal 100 at the TOA in the initial presumed location of the terminal 100, using the following Equation 1:

$$\text{GPS pseudo distance } (\rho) = \sqrt{(x_k - x)^2 + (y_k - k)^2 + (x_z - z)^2} + c(\Delta t_u - \Delta t_s) \ldots \quad (1)$$

Wherein $x_k$, $y_k$ & $x_z$ represent the locations of the user (i.e., values indicating the locations of a terminal), c represents the velocity of light, $\Delta t_u$ represents the reference time of a terminal and $\Delta t_s$ represents the reference time of a satellite and $(\Delta t_u - \Delta t_s)$ represents the value of a bias error of a GPS receiver clock of a terminal.

However, since the calculated GPS pseudo distance includes an error, the location determination server 400 calculates SV_CODE_PH from the GPS pseudo distance and determines the pseudo distance search range SV_CODE_PH_WIN.

The location determination server 400 can calculate SV_CODE_PH as follows, according to Equation 2:

$$\text{SV\_CODE\_PH} = \text{quotient}\left[\left\{\text{floor}\left(\frac{\rho}{c} \times 1000\right)\right\} \times 1023\right] \quad (2)$$

Wherein 1000 is a constant which is chosen for calculating SV_CODE_PH in a units of msec ($\frac{1}{100}$ sec.), since a period of a GPS PRN code is 1023 chip per 1 msec. Herein, 1023 is a GPS PRN code. Equation 2 is used for calculating which SV_CODE_PH is received at a time of application (TOA) in a GPS code period of 1 msec. (1023 chip period).

In Equation (2), ρ represents the GPS pseudo distance, c represents the velocity of light, floor ( ) represents a function that discards an integer part of a certain value and takes a fractional part of the value, and quotient ( ) represents a function that takes an integer part of a certain value. SV_CODE_PH calculated using Equation 2 has a GPS pseudo noise code and has a range in units of approximately 300 m. SV_CODE PH increases by a maximum of up to about 3.3 chips whenever a base line between sector centers of the serving base station increases by 1 km. For example, if the base line is 5 km, there occurs a difference of about 16.7 chips between SV_CODE_PH at the sector center of the serving base station and SV_CODE_PH in a location that is 5 km from the sector center of the serving base station. Based on such a principle, SV_CODE_PH cannot be equal to actual SV_CODE_PH due to a clock synchronization error of a base station or a measurement error. Thus, the location determination server 400 sets the pseudo distance search range SV_CODE_PH_WIN of the SV_CODE_PH.

The location determination server 400 can set SV_CODE_PH_WIN using Equation 3.

$$SV\_CODE\_PH\_WIN = 2\{\text{terminal location error} \times \cos(\text{satellite altitude}) + \text{margin}\} \quad (3)$$

In Equation (3), 'terminal location error' indicates a location error of the terminal 100 when the location determination server 400 wrongly estimates the initial location of the terminal 100. For example, when an error in the initial location of the terminal 100 is 1 km, it is preferable that the 'terminal location error' be a maximum of up to 3.3 chips. In Equation (3), the 'terminal location error' is multiplied by 'cos(satellite altitude)' because the 'terminal location error' has different influences according to the satellite altitude. In addition, 'margin' represents a change in SV_CODE_PH_WIN according to movement of a satellite.

Next, a description will be made of a procedure in which the location determination server 400 calculates the Doppler information of the GPS satellite based on the DELAY and sets of the Doppler search range. The location determination server 400 calculates Doppler information of the GPS satellite at the TOA in the initial presumed location of the terminal 100. The Doppler information of the GPS satellite may be calculated using a velocity vector of the GPS satellite and a velocity vector of the terminal 100. Since the velocity of the terminal 100 is relatively low, a change in the Doppler information, which is caused by the velocity of the terminal 100 during a short time period, is insignificant. Assuming that a 3-dimentional velocity vector of the GPS satellite is (Vx, Vy, Vz), the location of the GPS satellite be (X, Y, Z), and the initial presumed location of the terminal 100 is (x, y, z), then the Doppler information in the initial location of the terminal 100 may be calculated as follows according to Equation 4:

$$\text{Doppler} = -(f/c) * \{Vx*(X-x) + Vy*(Y-y) + Vz*(Z-z)\} / \text{(distance between satellite and terminal)} \quad (4)$$

In Equation (4), 'f' represents a transmission frequency and is equal to 1575.42 MHz, and 'c' represents the velocity of light.

However, since an error is included in the calculated Doppler information in the initial location of the terminal 100, the location determination server 400 calculates DOPPLER0 using the Doppler information in the initial location of the terminal 100 and sets the Doppler search range DOPPLER_WIN. In the location determination server 400, DOPPLER0 may be calculated as follows According to Equation 5:

$$\text{if Doppler>0, DOPPLER0=floor (Doppler/2.5) else,} \\ \text{DOPPLER0=4096-floor (abs (Doppler)/2.5),} \quad (5)$$

In Equation (5), abs ( ) is a function that takes the absolute value of a number.

However, since the calculated DOPPLER0 is not correct due to an error, the location determination server 400 sets the Doppler search range DOPPLER_WIN.

The location determination server 400 may set DOPPLER_WIN as follows according to Equation 6:.

$$\text{DOPPLER\_WIN=2\{terminal location error} \times \sin(\text{satellite altitude}) + \text{margin}\} \quad (6)$$

In Equation (6), 'terminal location error' indicates an error in the initial presumed location of the terminal 100. For example, when the error in the initial location of the terminal 100 is 1 km, it is preferable that the 'terminal location error' is a maximum of up to 1 Hz. Further, 'terminal location error' is multiplied by 'sin(satellite altitude)' because the 'terminal location error' has different influences according to the satellite altitude. In addition, 'margin' represents a change in DOPPLER_WIN according to movement of a satellite.

After calculating SV_CODE_PH and setting SV_CODE_PH_WIN, the location determination server 400 determines SV_CODE_PH, SV_CODE_PH_WIN, DOPPLER0, and DOPPLER_WIN, all of which are based on DELAY.

When DELAY is 0, SV_CODE_PH, SV_CODE_PH_WIN, DOPPLER0, and DOPPLLER_WIN are set to values calculated according to the conventional method.

When there occurs a repeater delay (DELAY) of a serving base station or of an adjacent base station, SV_CODE_PH, SV_CODE_PH_WIN, DOPPLER0, and DOPPLER_WIN may be determined as follows.

$$SV\_CODE\_PH = \text{calculated } SV\_CODE\_PH + \text{DELAY}/2$$

$$SV\_CODE\_PH\_WIN = \text{DELAY} + \alpha$$

$$\text{DOPPLER0} = \text{calculated DOPPLER0} + \text{DELAY}$$

$$\text{DOPPLER\_WIN} = \text{DELAY}/2 + \alpha$$

Herein, DELAY indicates the repeater delay, and a indicates a margin of a search range in consideration of a measurement error. The units of SV_CODE_PH, SV_CODE_PH_WIN, DOPPLER0, and DOPPLER_WIN are chips, and 1 chip has units of about 300 m that corresponds to 1 bit of a pseudo noise code of a GPS satellite.

Figure 7:
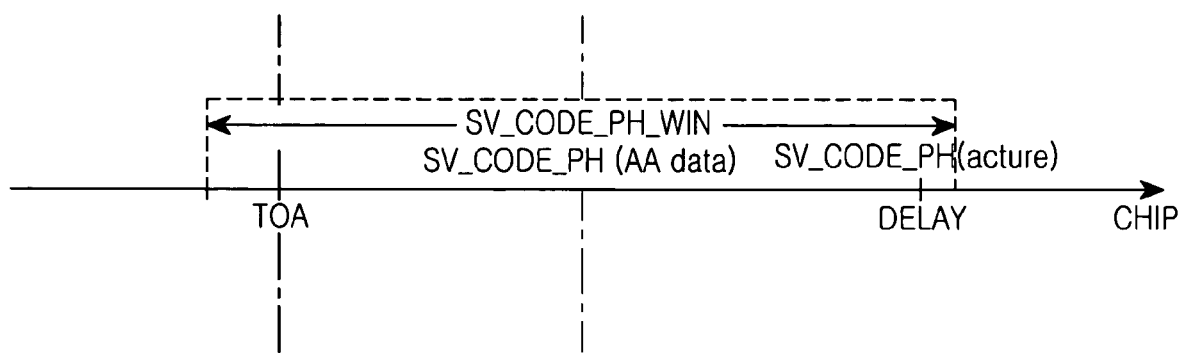
FIG. 7 shows a graph of pseudo distance information and a pseudo distance search range, both of which are based on a repeater delay, according to an embodiment of the present invention.

FIG. 7 shows SV_CODE_PH and SV_CODE_PH_WIN that are based on the DELAY, according to an embodiment of the present invention. Referring to FIG. 7, SV_CODE_PH is shifted from the TOA by DELAY/2, and SV_CODE_PH_WIN is set to have a range of DELAY+α around the shifted SV_CODE_PH. Thus, even when the pseudo distance of the GPS satellite which is measured in the terminal 100 is delayed by a repeater present in the base station, the pseudo distance falls within the set SV_CODE_PH_WIN. As a result, it is possible for the terminal 100 to acquire the GPS satellite signal.

The terminal 100 can acquire the GPS satellite signal using the repeater delay-based AA data even when the actual pseudo distance information of the GPS satellite and the Doppler information of the GPS satellite are delayed by the repeater delay.

Hereinafter, a procedure in which the terminal 100 acquires the GPS satellite signal using the repeater delay-based AA data will be described with reference to FIG. 8, which shows SV_CODE_PH, SV_CODE_WIN, DOPPLER0, and DOPPLER_WIN, all of which are based on the repeater delay, according to an embodiment of the present invention.

Figure 8:
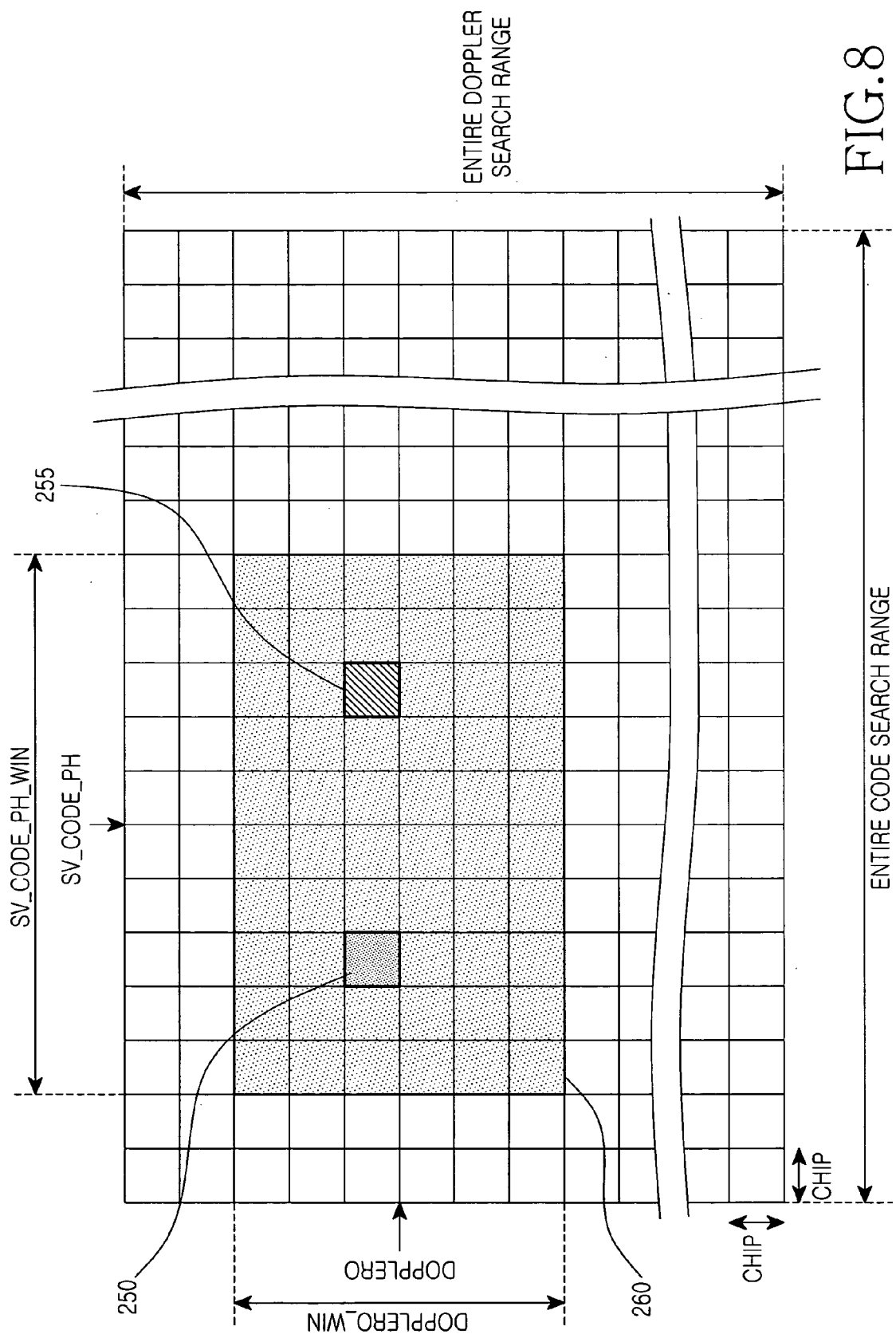
FIG. 8 shows a diagram including Doppler information, a Doppler search range, pseudo distance information, and a pseudo distance search range, all of which are based on a repeater delay, according to an embodiment of the present invention.

Referring to FIG. 8, the terminal 100 searches for the pseudo distance information and the Doppler information according to the repeater delay-based AA data provided from the location determination server 400. In other words, the terminal 100 searches SV_CODE_PH_WIN around SV_CODE_PH that is based on the repeater delay within the entire code search range for the pseudo distance information. Also, the terminal 100 searches DOPPLER_WIN around DOPPLER0 that is based on the repeater delay within the entire Doppler search range for the Doppler information. In other words, the terminal 100 searches only a code and Doppler search range 260 among the entire code and Doppler search range, which corresponds to the repeater delay-based AA data. The code and Doppler search range 260 corresponding to the repeater delay-based AA data includes an actual code and Doppler information area 255 of the terminal 100 which is delayed by the repeater delay, as well as an actual code and Doppler information area 250 calculated without delay, unlike a conventional code and Doppler search range. Thus, even when the repeater delay occurs, the terminal 100 can acquire the GPS satellite signal using the repeater delay-based AA data. In other words, according to an embodiment of the present invention, the terminal 100 can more finely and stably acquire the GPS satellite signal using the repeater delay-based AA data. Also, the terminal 100 accurately calculates the pseudo distance information of the GPS satellite using the more accurately acquired GPS satellite signal, thereby improving the accuracy of calculation of a terminal location.

As described above, according to the present invention, the repeater delay is determined using information on a repeater. The Doppler information, the pseudo distance information, the Doppler search range, and the pseudo distance search range are determined according to the repeater delay, and then the repeater delay-based AA data is created. In other words, according to the present invention, a bias error range of a terminal clock is estimated using the information on the repeater and more accurate AA data is created using the estimated bias error of the terminal clock. The repeater delay-based AA data enables a terminal to more finely and stably acquire the GPS satellite signal. Also, accurate and stable acquisition of the GPS satellite signal of the terminal enhances the accuracy of calculation of the terminal location in the AGPS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for creating acquisition assistance information for acquiring of a global positioning system (GPS) signal in an assisted global positioning system (AGPS), the method comprising the steps of:
   (a) receiving repeater information included in a mobile communication network of a terminal whose location is to be measured, in response to a request for the acquisition assistance information for acquiring of the GPS signal from the terminal;
   (b) determining a repeater delay introduced by a repeater that is present between the terminal and a base station that is synchronized with the terminal using the repeater information, wherein the repeater information is estimated through analysis of a base station signal that is observable by the terminal; and
   (c) creating the acquisition assistance information for acquiring of the GPS signal of the terminal based on the repeater delay;
   wherein a repeater delay determines a plurality of acquisition assistance information including Doppler information, pseudo distance information, Doppler search range, and pseudo distance search range; and
   (d) setting the repeater delay information to a previously set initial value if the repeater delay information is not available.

2. The method of claim 1, wherein step (b) comprises the steps of:
   (b-1) determining if the repeater delay information is available from the repeater information;
   (b-2) determining whether to use only the repeater delay information of a serving base station or to use both the repeater delay information of the serving base station and the repeater delay information of an adjacent base station, if it is determined in step (b-1) that the repeater delay information is available; and
   (b-3) setting the repeater delay information of the serving base station to the repeater delay if it is determined to use only the repeater delay information of the serving base station, and setting the largest value among repeater delays of the serving base station and the adjacent base station to the repeater delay if it is determined to use both the repeater delay information of the serving base station and the repeater delay information of the adjacent base station.

3. The method of claim 2, wherein the repeater delay information of the serving base station represents a difference between i) an estimated arrival time difference between a serving base station signal and an adjacent base station signal that are received by the terminal at an initial presumed location of the terminal and ii) a measured arrival time difference between a serving base station signal and an adjacent base station signal that are actually received by the terminal.

4. The method of claim 2, wherein if there exists the repeater delay information of the serving base station, the repeater delay information of the adjacent base station represents the sum of i) the repeater delay information of the serving base station and ii) the difference between a measured arrival time difference between a serving base station signal and an adjacent base station signal that are actually measured by the terminal and an estimated arrival time difference between the serving base station signal and the adjacent base station signal.

5. The method of claim 1, wherein step (c) comprises the steps of:
   (c-1) determining a time of application of the acquisition assistance information so that the terminal can acquire the GPS signal; and
   (c-2) creating the acquisition assistance information by determining pseudo distance information of a GPS satellite, a pseudo distance search range of the GPS satellite, Doppler information of the GPS satellite, and a Doppler search range of the GPS satellite based on the repeater delay at the time of application.

6. The method of claim 5, wherein in step (c-1), an initial presumed location of the terminal is estimated and the time of application used for the terminal to apply the acquisition assistance information is determined using a one-way delay from the terminal to a base station that is clock-synchronized with the terminal.

7. The method of claim 5, wherein step (c-2) comprises the steps of:
   (c-2-1) calculating a pseudo distance of the GPS satellite that can be received by the terminal at the time of application in the initial presumed location of the terminal;
   (c-2-2) calculating pseudo distance information of the GPS satellite, a pseudo distance search range of the GPS satellite, Doppler information of the GPS satellite, and a Doppler search range of the GPS satellite from the calculated pseudo distance of the GPS satellite;
   (c-2-3) determining pseudo distance information of the GPS satellite, a pseudo distance search range of the GPS satellite, Doppler information of the GPS satellite, and a Doppler search range of the GPS satellite, all of which are based on the repeater delay using the information calculated in step (c-2-2) and the repeater delay; and
   (c-2-4) creating the acquisition assistance information including the information determined in step (c-2-3).

8. The method of claim 7, wherein the pseudo distance information of the GPS satellite, which is based on the repeater delay, is determined by adding a half of the repeater delay to previously calculated pseudo distance information of the GPS satellite, the pseudo distance search range that is based on the repeater delay is set larger than or equal to the repeater delay, the Doppler information is based on repeater delay and previously calculated Doppler information, and the Doppler search range that is based on the repeater delay is set larger than or equal to the half of the repeater delay.

* * * * *